United States Patent [19]

Loker

[11] 4,244,455

[45] Jan. 13, 1981

[54] ROTARY SHAFT DECOUPLING MECHANISM

[75] Inventor: W. Aleck Loker, Leonardtown, Md.

[73] Assignee: The United States of America as represented by the Secretary of the Navy, Washington, D.C.

[21] Appl. No.: 952,169

[22] Filed: Oct. 17, 1978

[51] Int. Cl.³ .............................................. F16D 11/06
[52] U.S. Cl. .................................. 192/24; 64/27 NM
[58] Field of Search .................... 192/24, 89 A, 93 R; 64/23, 6, 2 R, 9 A

[56] References Cited

U.S. PATENT DOCUMENTS

| 1,367,309 | 2/1921 | Dunham | 192/24 X |
|---|---|---|---|
| 2,384,418 | 9/1945 | Edmondson | 192/24 X |
| 2,505,120 | 4/1950 | Jackson | 64/27 NM |
| 2,551,922 | 5/1951 | Aveta | 192/89 A |
| 2,642,970 | 6/1953 | Szekely | 192/24 |
| 2,812,840 | 11/1957 | Winter . | |
| 2,989,857 | 6/1961 | Hezland | 64/27 R X |
| 3,224,398 | 12/1965 | Greulich . | |
| 3,602,345 | 8/1971 | Rattenberg . | |
| 3,606,800 | 9/1971 | Treff . | |
| 3,621,675 | 11/1971 | Conaghan | 64/27 NM |
| 3,715,018 | 2/1973 | Kadowaki | 192/24 |
| 3,729,953 | 5/1973 | Wanzer | 64/9 A |
| 3,760,919 | 9/1973 | Gilsinger | 192/89 A |
| 3,839,883 | 10/1974 | Braess | 64/27 NM |

Primary Examiner—Nile C. Byers, Jr.
Attorney, Agent, or Firm—Richard S. Sciascia; Harvey A. David

[57] ABSTRACT

A rotary power transmitting shaft decoupling device has a driving component axially aligned with a driven component and keyed thereto by a plurality of force transmitting elements held in operable relation to the driving and driven components, respectively, by an axially shiftable slide element that is coaxial with the driving and driven components and is provided with a lead screw. Actuation to effect decoupling is effected by engaging the lead screw with a plunger so that rotation of the device results in axial shifting of the slide element and withdrawal of the force transmitting elements from operable relation to the driving and driven components.

4 Claims, 8 Drawing Figures

ROTARY SHAFT DECOUPLING MECHANISM

BACKGROUND OF THE INVENTION

This invention relates generally to rotary shaft decoupling devices, and more particularly to a novel and improved shaft decoupler which enables interrupting the transmission of torque between a prime mover such as an engine and a driven accessory such as a pump.

A variety of techniques have been employed in existing shaft disconnect mechanisms, all of which suffer from reliability problems, maintainability problems and other aspects that make them undesirable. One type of shaft disconnect in wide use is the "guillotine" type in which a solid rotating shaft is fractured by impact (shear rupture) with a plunger thrust into the plane of rotation of an eccentric lobe or cam. That device, although quite simple, and therefore reliable, causes maintenance problems when it is actuated because of the severity of the impact and the necessity to replace a number of rather expensive parts.

A second disconnect type in wide use consists of a face gear arrangement, also called a curvic coupling, which is caused to separate or disconnect by sliding one half of the gear set axially away from the other half. When the gear teeth no longer mesh one half (the driven half) of the coupling ceases rotation. A major problem with this class of disconnects is wear of the loaded metal surfaces such as the gear teeth and bearing surfaces. As wear due to fretting progresses, a build-up of oxidized wear debris inhibits the sliding motion often times preventing the coupling from disconnecting when called upon. The wear also progresses at times to the extent that the coupling fails during service causing a disconnect inadvertently. This leads to a hazardous situation since it occurs unannounced and results in the inflight loss of an important propulsion subsystem such as a generator or pump. This second category of disconnect design also accounts for a large number of maintenance problems due to the complexity of the design and the need for higher level maintenance attention.

Other existing disconnect designs differ somewhat in the method of decoupling, but exhibit the same basic failings due to wear and the related damage during disconnect. They also share the same safety hazard potential, unreliability and requirement for frequent, higher level maintenance.

SUMMARY OF THE INVENTION

With the foregoing in mind, it is a principal object of this invention to provide an improved rotary shaft decoupler for use in interrupting the delivery of rotary power from an engine, motor, or other prime mover to a driven apparatus, accessory, or the like.

Another object of this invention is the provision of a shaft decoupling device that is actuable within a single revolution to decouple the driving and driven components thereof in such manner as to permit the driven component to cease rotation or freewheel relative to the driving component.

Yet another object is the provision of a shaft decoupling device that, once actuated to decouple, will maintain the decoupled condition, irrespective of direction of later relative rotations of the components, until such time as the device is purposely restored to a driving condition.

A further object of the invention is the provision of a rotary shaft decoupling device that is non-destructive of parts or components upon actuation.

Still another object is to provide a rotary shaft decoupling device that is self-energizing in actuation of a shiftable element.

As another object, the invention aims to provide a shaft decoupling device of the foregoing character that is inexpensive to construct, reliable in operation, requires a minimum of maintenance, and can be readily restored to a driving condition without repairs or replacement of costly parts.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
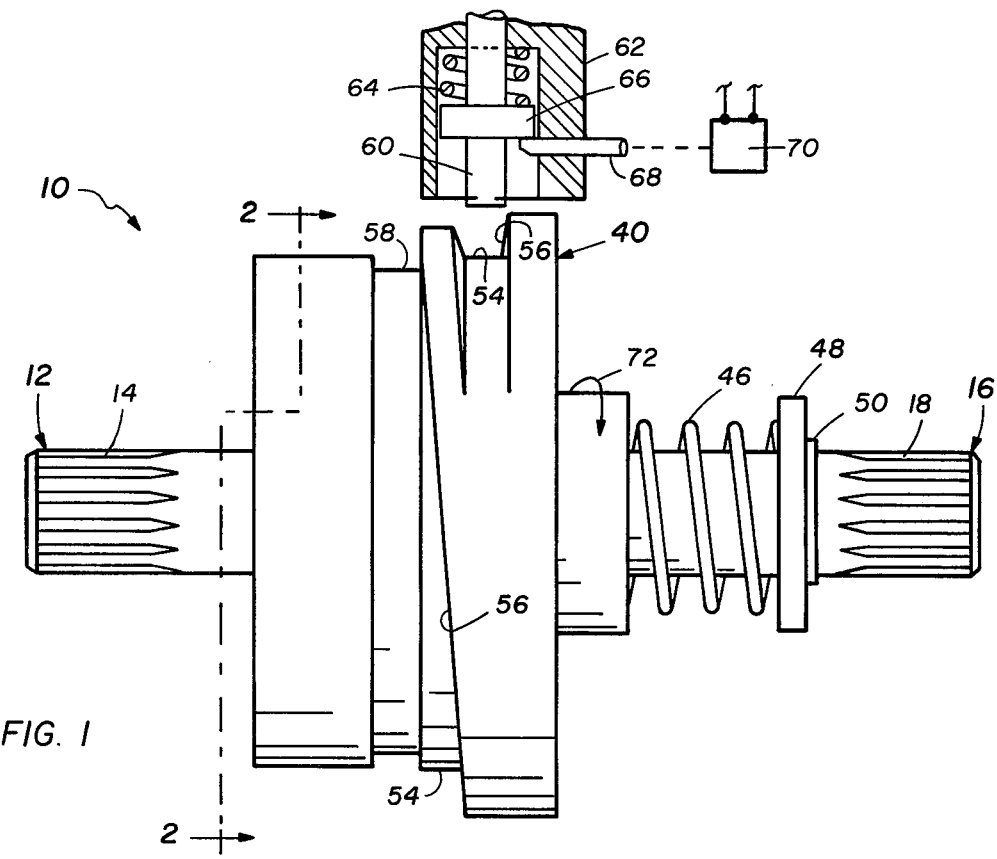
FIG. 1 is an elevational view illustrating an improved shaft decoupling device embodying this invention.

In the form of the invention illustrated in FIGS. 1-4, a rotary shaft decoupling device 10 comprises an input or driving component 12 including an input shaft 14 adapted to be connected to a suitable engine or prime mover. The shaft 14, in this example is splined for convenient connection to the prime mover. The device 10 also comprises an output or driven component 16 including an output shaft 18 which is axially aligned with the shaft 14. The shaft 18 is splined for convenient connection to a rotary power utilization means such as a generator, pump, or other engine driven accessory. The driving and driven components are preferably formed of steel or other rigid material.

Figure 2:
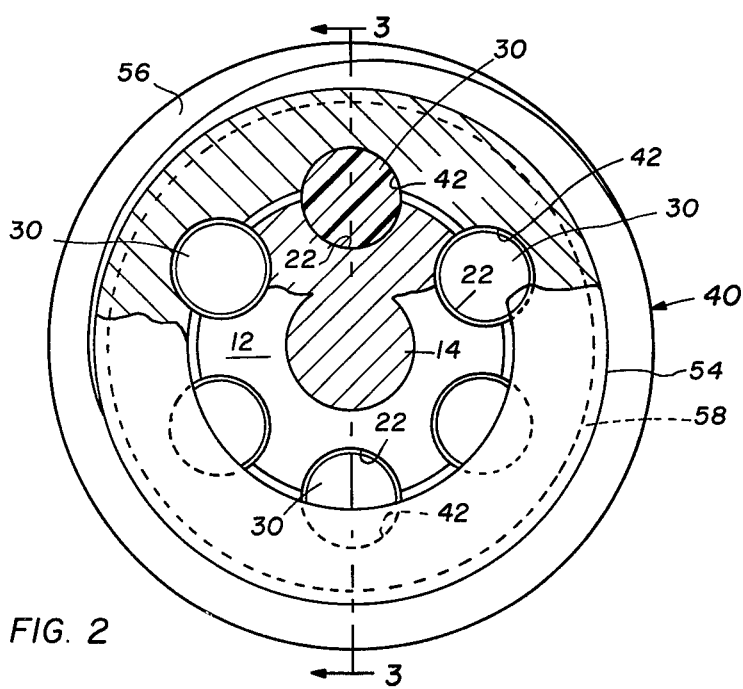
FIG. 2 is a sectional view of the device of FIG. 1 taken substantially along line 2—2 thereof.
Figure 3:
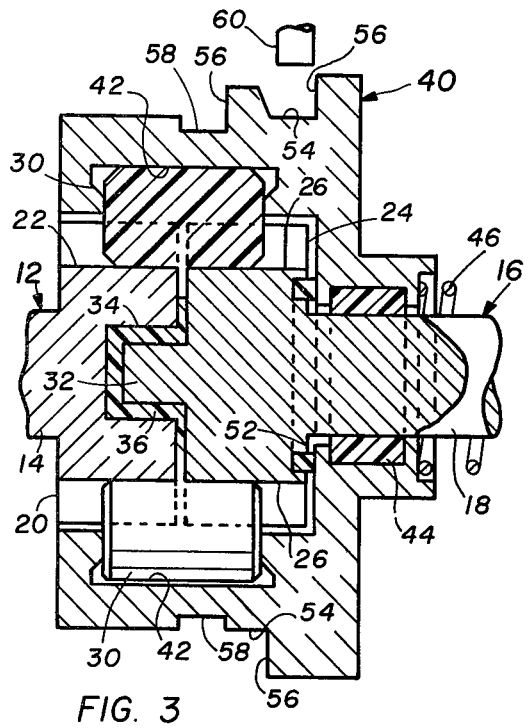
FIG. 3 is a fragmentary sectional view taken substantially along line 3—3 of FIG. 2.

As is best seen in FIGS. 2 and 3, the driving element 12 comprises a drum or flange 20 having six semi-cylindrical, axially extending grooves 22 equally spaced about the periphery thereof. The driven element 16 comprises a similar drum or flange 24 having corresponding semi-cylindrical, axially extending grooves 26. The flanges 20, 24 are in face to face relation and are keyed together for rotation about their common axis by a plurality of cylindrical, force transmitting elements 30. The elements 30 are preferably formed of a high impact resistant, non-metallic or plastic material such as a polyimide, aramid, or polyimide-amide.

Provision is made for maintaining the driving and driven components 12 and 16 in alignment, while permitting relative rotation therebetween upon decoupling. To this end, the driven component 16 is provided with a stub shaft 32 that is rotatably received in a journal portion of a combined journal and thrust bearing 34 carried in a recess 36 of the driving component 12. The bearing 34 is preferably formed of a solid lubricant filled plastic material.

An annular slide element 40 surrounds the flanges 20 and 24 and the force transmitting elements 30. The slide element 40 is provided with recesses 42 in which the force transmitting elements 30 are partially received and confines those elements against radial movement out of the grooves 22, 26. The element 40 is axially slidable relative to the driving component 12 to withdraw the elements 30 from engagement with the grooves 22 of the flange 20 thereof in a manner which will be made apparent as this specification proceeds.

The slide element 40 is slidably journalled on the shaft 18 by a plastic bearing 44 and is resiliently urged toward the driving component by a compression spring 46 acting between the slide element and a spring cup 48 retained in position on the shaft 18 by a retainer 50. An annular plastic thrust bearing 52 carried in the flange 24 limits movement of the slide member 40 and elements 30 to the left under the influence of the spring 46.

When the parts of the device 10 are in their respective positions as illustrated in FIGS. 1-3, the driving component 12, the driven component 16, the force transmitting elements 30, and the slide element 40 all rotate as a unit delivering rotational power from the input shaft 14 to the output shaft 18.

Means are provided for using rotation of the device 10 to effect axial shifting of the slide element 40 and the force transmitting elements 30 so as to rapidly decouple the driving component and the driven component. Thus, the slide element 40 is provided with a helical groove 54 defined on one side by a helical thread wall 56. The helical groove 54 leads to a deeper annular groove 58.

An actuating plunger 60 is adapted to engage in the groove 54 and cooperate with the thread wall 56 to cause axial shifting of the slide element to the right as viewed in the illustrations. The plunger 60 is reciprocably carried in a housing 62 and is resiliently biased toward the axis of the device 10 by a spring 64 acting between the housing and a flange 66 on the plunger. The plunger is normally held in a retracted position, as shown in FIG. 1, by a sear pin 68 that is actuable, for example, by an electrical solenoid 70 to release the plunger.

MODE OF OPERATION

Figure 4:
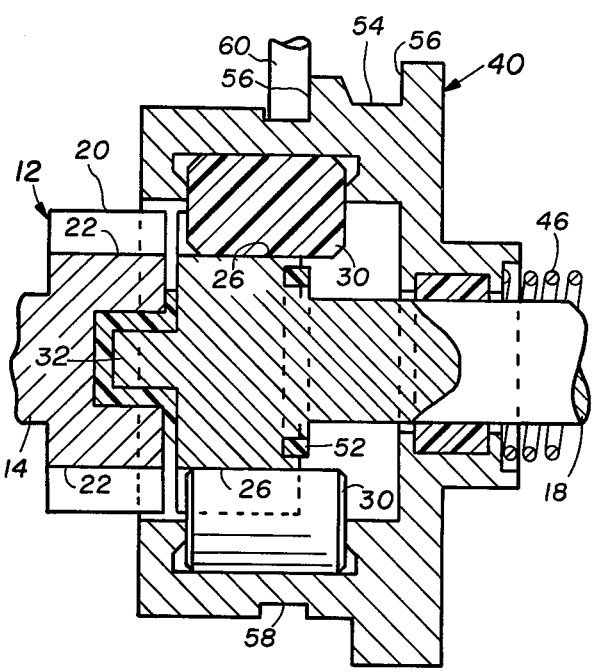
FIG. 4 is a view similar to FIG. 3, but showing parts in different operational positions.

Consider the device 10 to be rotating in the direction of the arrow 72 in FIG. 1. Upon actuation of the sear the plunger 60 is propelled into the groove 54. Rotation of the slide element 40 and cooperation of the plunger 60 and helical thread wall 56 cause the slide element to move axially to the right, carrying the force transmitting elements 30 with it. The axial movement of the slide element 40 continues until the plunger 60 drops into the annular groove 58, as shown in FIG. 4, at which time the elements 30 are well clear of their respective grooves 22 in the flange 20 of the driving component 12. In this condition, the slide element 40 is retained in the FIG. 4 position during slow down of the decoupled accessory and irrespective of subsequent reversals of direction of rotation of the decoupled accessory due to windage, or the like.

Recoupling of the device is readily accomplished, without need of replacement of force transmitting elements, shear pins or the like, by simply retracting the plunger 60 and aligning the elements 30 with grooves 22 so that the spring 46 can return the slide element 40 and elements 30 to their FIG. 3 positions.

Figure 5:
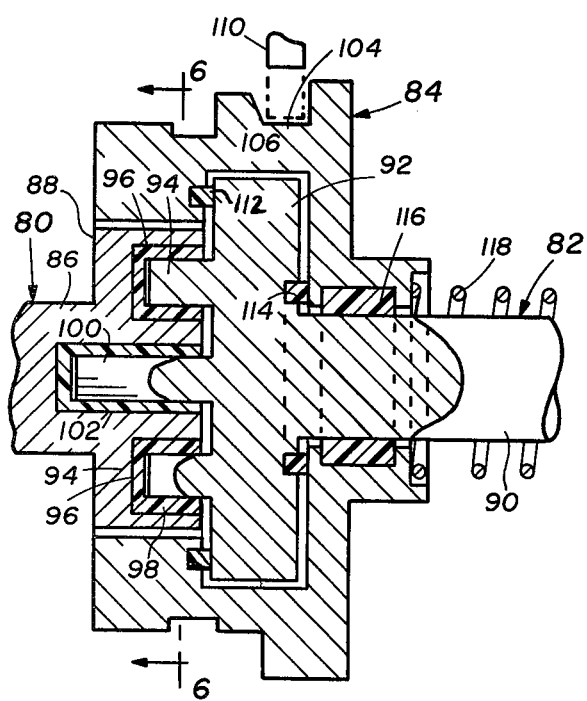
FIG. 5 is a sectional view of an alternative embodiment of the invention.
Figure 6:
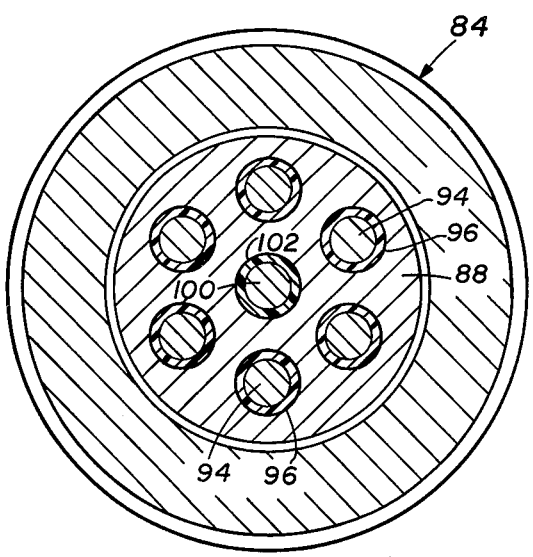
FIG. 6 is a sectional view taken substantially along line 6—6 of FIG. 5.

Referring now to FIGS. 5 and 6, another embodiment of the invention comprises a driving component 80, a driven component 82 and a slide element 84. The driving component includes an input shaft 86 and flange 88. The driven component 82 includes an output shaft 90 axially aligned with the shaft 86, and a flange 92 adjacent the flange 88.

The driven component 82 is further provided with a plurality of force transmitting elements in the form of rigid cylindrical projections 94 extending from the flange 92 into plastic bushings 96 lining corresponding cylindrical recesses 98 in the flange 88. An axial stub shaft 100 extends from the driven component 82 into a coaxial recess in the driving element and lined with a plastic bearing 102.

In this embodiment, the slide element 84 is provided with helical and retaining grooves 104, 106 corresponding to those earlier described and cooperates with a plunger 110 to effect axial movement of the slide element and the associated driven component flange 92 away from the driving component 88 so as to withdraw the force transmitting elements 94 therefrom. In this embodiment the shaft 90 is considered to be axially shiftable, as by a sliding spline connection, relative to some utilization device. Annular plastic bearings 112, 114 and 116 provide anti-fretting isolation of the slide element 84 relative to the driven component, while gripping the latter sufficiently to ensure the rotation of the slide element with the driven component necessary to derive axial movement through the lead screw action during decoupling. The spring 118 reacts against a non-axially moving portion of the mentioned sliding spline connection (not shown).

Figure 7:
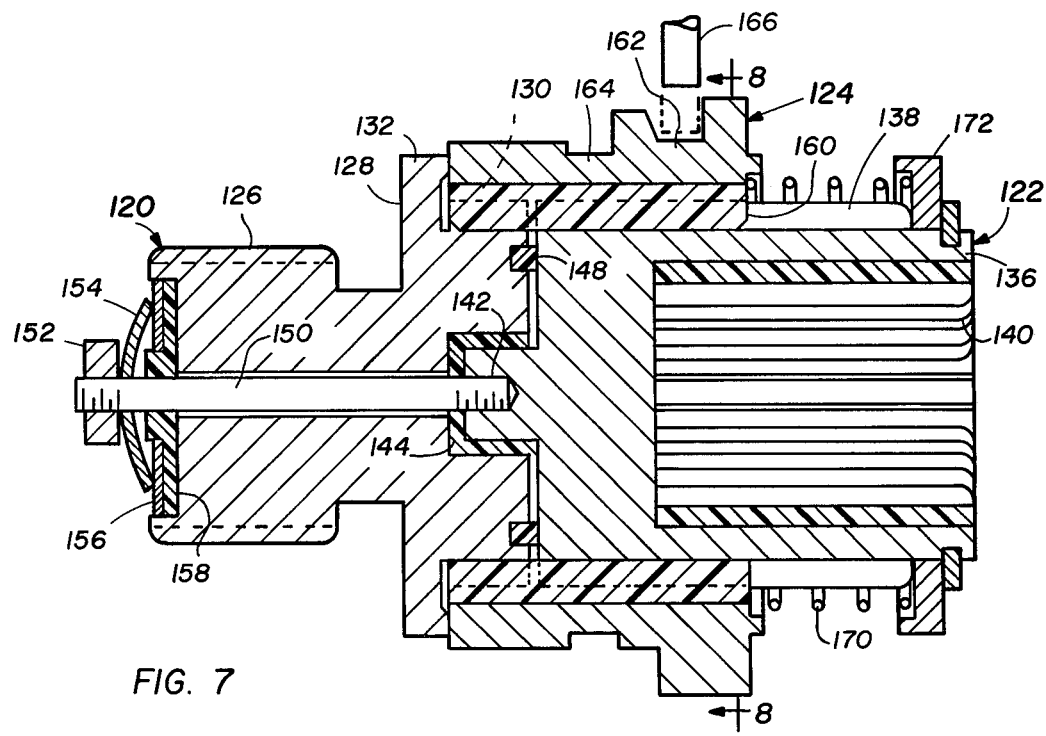
FIG. 7 is a sectional view of another alternative embodiment of the invention.
Figure 8:
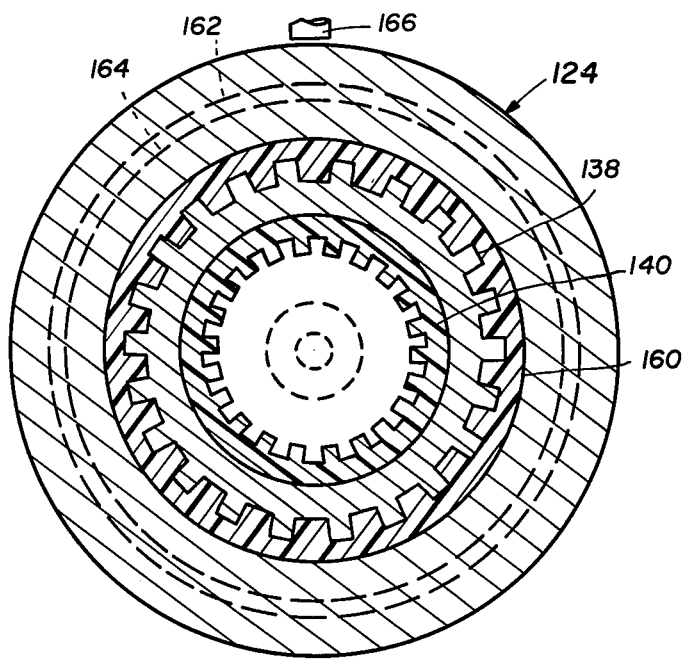
FIG. 8 is a sectional view taken substantially along line 8—8 of FIG. 7.

Referring now to FIGS. 7 and 8, an additional embodiment of the invention comprises a driving component 120, a driven component 122, and a slide element 124. The driving component comprises a splined input shaft 126 and a flange 128 characterized by a splined portion 130 and a stop flange 132. The driven component is characterized as a hollow drum or shaft 136 having external splines 138 and provided with an internally splined plastic liner 140 adapted to receive a splined shaft of a utilization means or accessory.

The driven component is further provided with a stub shaft 142 received in a plastic bearing 144 recessed in the driving component and providing support therefore after a decoupling event. An annular plastic thrust bearing 148 is disposed between the driving and driven components.

A stud 150 extends from the driven component through a bore in shaft 126 beyond the end thereof. A nut 152 on the stud 150 cooperates with a bellville washer 154, flat washer 156, and plastic thrust washer 158 to hold the driving and driven components 120, 122 in coaxial assembled relation while permitting relative rotation therebetween when decoupled.

The slide element 124 comprises a force transmitting element in the form of an internally splined liner 160 of a high impact strength plastic material. The slide element 124 is provided with a helical groove 162 and an annular retaining groove 164 that cooperate with a spring biased actuator plunger 166 to effect axial shifting and retention of the slide element and the force transmitting splined liner 160.

A spring 170 acts between a spring cup 172 on the shaft 136 and the slide element 124 to normally hold the latter in its illustrated position. Upon actuation of the plunger 166 into groove 162, the slide element is axially shifted to the right, due to rotation of the device, withdrawing the splines of liner 160 from the splines 130 of the driving component, thereby effecting decoupling thereof from the driven component. Recoupling is readily effected by retraction of the plunger from the groove 164, and allowing the spring 170 to move the slide element and the splined liner 160 into reengagement with the splines 130 of the driving component 120.

Obviously, many modifications and variations of the present invention are possible in the light of the above teachings. For example, the roles of the driving and driven components can be reversed, with the slide element being carried by the driving component rather than the driven. Also, force transmitting elements that differ in configuration or number may be employed. It is therefore to be understood that, within the scope of the claims, the invention may be practiced otherwise than as specifically described.

I claim:

1. A rotary shaft decoupling device comprising:
   an input shaft rotatable about its longitudinal axis;
   a driving component fixed on said input shaft for rotation therewith and fixed against axial movement, said driving component having a first diameter and characterized by a plurality of axially extending first external grooves spaced about the periphery thereof;
   an output shaft aligned with said input shaft for rotation about said axis;
   a driven component fixed on said output shaft for rotation therewith and fixed against axial movement, said driven component being disposed immediately adjacent said driving component with a discontinuity therebetween and having a like plurality of axially extending, second external grooves spaced about the periphery thereof, said second external grooves being aligned with said first external grooves;
   force transmitting means formed of a high impact resistant synthetic plastic material and comprising a plurality of force transmitting elements and having a first position wherein said elements are engaged in said aligned first and second external grooves so as to span said discontinuity and key said driving and driven components together for positive simultaneous rotation;
   slide means, coaxially mounted for rotation with one of said components and surrounding said force transmitting means, said slide means being mounted for axial movement relative to said components and operative to shift said force transmitting means from said first position to a second position wherein said elements are entirely to one side of said discontinuity, whereby said driven component is decoupled from positive simultaneous rotation with said driving component;
   biasing means yieldably urging said slide means in a direction for holding said force transmitting means in said first position; and
   actuator means for effecting said axial movement of said slide means in response to rotation thereof.

2. A rotary shaft decoupling device as defined in claim 1, and wherein:
   said driving component comprises a first flange and said axially extending first external grooves are semi-cylindrical;
   said driven component comprises a second flange, said axially extending second external grooves are semi-cylindrical and aligned with corresponding ones of said first external grooves;
   said force transmitting means comprises a plurality of high impact resistant plastic cylinders disposed in said aligned first and second external grooves and axially slidable so as to be free of engagement with the grooves of one of said first and second flanges; and said slide means comprises a body defining recess means receiving portions of said cylinders.

3. A rotary shaft decoupling device as defined in claim 1, and wherein:
   said driving component comprises a flange portion characterized by external first splines defined by said first external grooves;
   said driven component comprises a drum portion characterized by external second splines defined by said second external grooves and axially aligned with said first splines;
   said slide means comprises an annular body coaxial with said driving and driven components; and
   said force transmitting means comprises an insert of high impact resistant plastic carried internally of said annular body and characterized by force transmitting elements comprising internal third splines engaging and axially slidable on said first and second splines.

4. A rotary shaft decoupling device as defined in claim 3, and further comprising:
   alignment and thrust bearing means disposed between said driving component and said driven component;
   stud means extending from said driven component axially through said driving component; and
   resilient tensioning means, acting between said stud means and said driving component, for drawing said driving and driven components against said bearing means with a predetermined load, whereby said driving and driven components are maintained in alignment after decoupling.

* * * * *